Jan. 13, 1925.
J. F. MARTIN
1,523,135
NONSKID DEVICE FOR VEHICLE WHEELS
Filed April 30, 1924
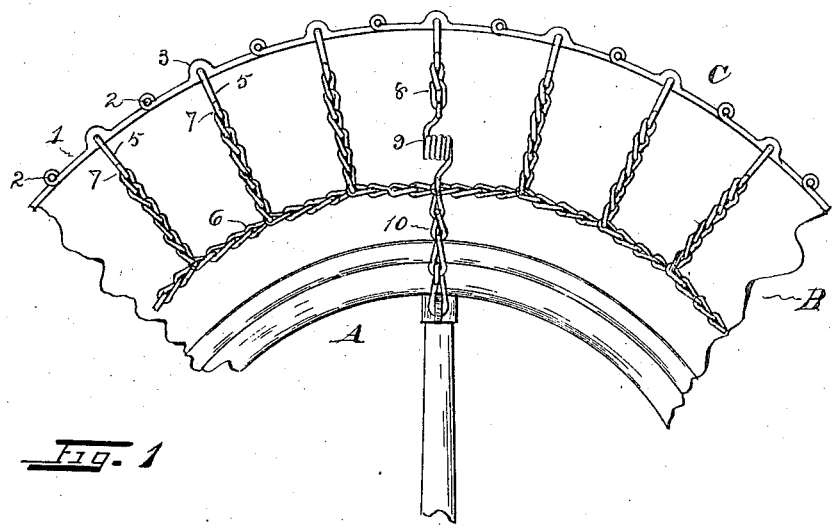
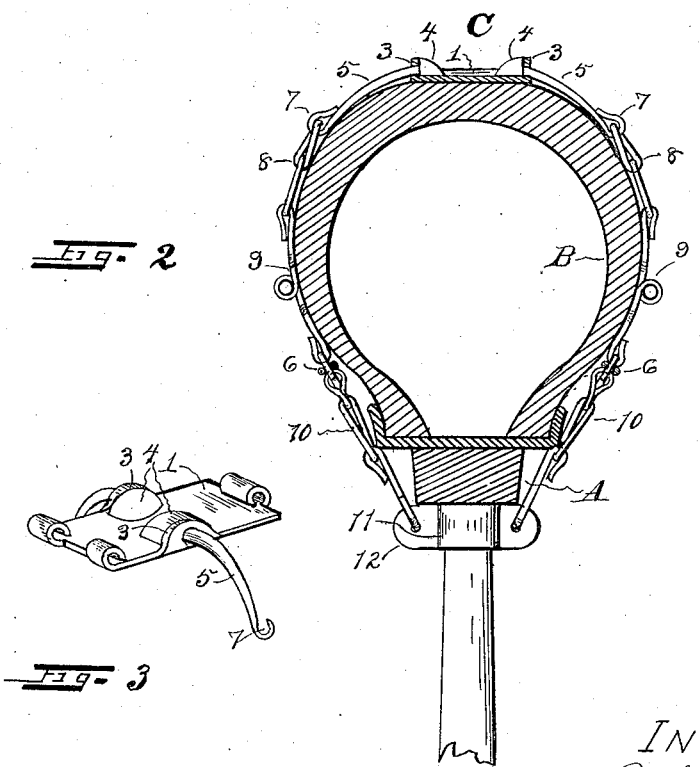
INVENTOR.
John F. Martin
By Victor E. Randall
Atty.

Patented Jan. 13, 1925.

1,523,135

UNITED STATES PATENT OFFICE.

JOHN F. MARTIN, OF NEWTON, MICHIGAN.

NONSKID DEVICE FOR VEHICLE WHEELS.

Application filed April 30, 1924. Serial No. 710,113.

*To all whom it may concern:*

Be it known that I, JOHN F. MARTIN, a citizen of the United States, residing in Newton, in the county of Calhoun and State of Michigan, have invented certain new and useful Improvements in Nonskid Devices for Vehicle Wheels, of which the following description, with appended claims, taken in connection with the accompanying drawing, forms a specification.

The invention more particularly relates to portable means applicable to pneumatic tires for automobiles to prevent slipping or skidding. A characteristic feature of the invention is a series of tread lugs which are removably attached to a jointed flattened tread band and so designed that the lugs will not only protect the band from road wear but will effectually prevent slipping or skidding, the lugs having reduced curved shanks projecting from both sides of the tread band and connecting with chain sections which couple with side chains on both sides of the tire.

One feature of the invention embraces a series of novel spring sections in the make-up of the means for attaching the device to a tire, which increase the usefulness of the mechanism as a whole without causing chafing to the tire sides.

The foregoing features in combination with a tire attachment, as will be hereinafter more fully set forth, and described, embody an anti-skid mechanism for automobiles unique in its make-up and thoroughly effective for the purpose designed.

In the drawing forming a part of this specification,

Figure 1 represents a side elevation of a tire section and wheel with an embodiment of my anti-skid mechanism attached.

Fig. 2 is a detail cross section at a point where the mechanism is connected to the spoke of a wheel.

Fig. 3 is a detail perspective view of a section or link of the tread band with its removable anti-skid lugs and side chain connecting shanks.

A represents an automobile wheel; B, a pneumatic tire; and C, my anti-skid mechanism, collectively.

Encompassing the tire B, a chain of flattened metallic links slightly curved longitudinally is provided. The links 1 of this chain are secured at their interconnected ends by pintles 2 in the usual manner for securing hinged members. The links of this chain are formed with upwardly-curved centrally-disposed ears 3 which are pierced in alignment for the reception and attachment of lug elements 4. The lug elements 4 have flattened surfaces where they are in contact with the links and are rounded to conform to the ears 3 against which the base of the lugs abut. The lugs are preferably co-incident in outline with the ears 3 where they abut or they may be somewhat larger and extend beyond the ears, their function in either instance, aside from providing anti-skid elements, being to minimize the wear of the ears in road traffic. Shanks 5 of the lugs extend through the apertures in the ears 3, and the formation of the parts is such that the face of the links and the lower curve of the perforations through said ears are on the same line, the purpose being to permit the shanks of the lugs to be as close to the tire, as possible and also to afford a more stable anchorage to the lugs. The flattening of the lugs is to increase the durability of the associated parts by their ability to withstand the natural road wear.

Chains 6 are located on both sides of the tire in a manner common in the art and may be connected directly to hooked ends 7 of the shanks 5 or be connected by means of short chain sections 8, as expedient. As shown, I have illustrated one embodiment of a flexible element interconnected between the sections 8. This flexible element consists of a spring 9 coiled intermediate its eyeleted ends, the coiled portion lying longitudinally against the tire, its terminals being coincident with its curvature and bent inwardly on a line approximately transverse its coils, as shown, the object being to prevent undue friction and wear of the tire against which the spring and terminals lie. Where these spring elements are placed, side retaining connections 10 are made with clamping or band members 11 about the spoke of the wheel. The flexible element 9 may be wholly removed from between the side chains 6 and directly connected with said side chains and the ears 12 of the bands 11 in lieu of the linked connections 10, as expedient, an object of the flexible element attached in either manner being to provide a compensating medium for slackness in the chain and associated parts in connection with a pneumatic tire.

I am aware that certain details of construction other than what I have disclosed might be resorted to in carrying out my invention, and I reserve the right to form, arrange and adjust the various elements that will effect the advantages as outlined as compatible and with my inherent and protected rights.

Having, therefore, disclosed my invention, what I claim as new and desire to secure by Letters Patent, is:—

1. In an anti-skid mechanism for pneumatic tires, the combination with a flat metallic link tread for a tire, said links being formed with intermediate outwardly-formed curved ears having aligned holes coincident with the face of said links, lug elements having rounded outer portions with reduced shanks having hooked ends and extending outwardly through said holes, the lug portions of said elements having flattened portions adapted to lie on the faces of said links, and vertical shoulder portions against said ears, the contour of said lugs adapted to conform to and protect said ears, substantially as and for the purpose specified.

2. In an anti-skid mechanism for vehicle wheels, the combination with a wheel, a pneumatic tire for said wheel and an anti-skid chain mechanism including side chains both sides of said tire, of spring elements oppositely positioned at intervals about said tire and engaging said side chains, said spring elements being coiled intermediate their ends, with said coils lying concentric with the circumference and at the sides of said tire, the ends of said springs being tangent with their coils and against said tire, said ends curving inwardly, thence outwardly on a line approximately transverse to their coils and terminating with loop or looped extremities, and means for connecting opposite spring elements with the spoke of a wheel.

JOHN F. MARTIN.

Witnesses:
 MADELINE L. FARROW,
 DORR K. BRADLEY.